United States Patent
Trossen et al.

(10) Patent No.: US 7,525,940 B2
(45) Date of Patent: Apr. 28, 2009

(54) RELOCATION OF CONTENT SOURCES DURING IP-LEVEL HANDOFFS

(75) Inventors: Dirk Trossen, Cambridge, MA (US); Hemant M. Chaskar, Woburn, MA (US)

(73) Assignee: Nokia Siemens Networks Oy (FI)

( * ) Notice: Subject to any disclaimer, the term of this patent is extended or adjusted under 35 U.S.C. 154(b) by 446 days.

(21) Appl. No.: 10/144,279

(22) Filed: May 10, 2002

(65) Prior Publication Data

US 2003/0212764 A1   Nov. 13, 2003

Related U.S. Application Data

(60) Provisional application No. 60/375,414, filed on Apr. 26, 2002.

(51) Int. Cl.
  *H04Q 7/00* (2006.01)
(52) U.S. Cl. .................... 370/331; 709/203; 709/219; 709/228; 709/232; 455/432.1; 455/435.1; 455/437; 455/442
(58) Field of Classification Search .................. 709/203, 709/205, 228, 238, 239, 242, 202, 217, 232, 709/230, 231, 219, 243; 455/436, 439, 432.1, 455/435.1, 437, 442; 370/331
See application file for complete search history.

(56) References Cited

U.S. PATENT DOCUMENTS

| | | | | |
|---|---|---|---|---|
| 5,274,841 A * | 12/1993 | Natarajan et al. | ........... | 370/337 |
| 5,572,648 A * | 11/1996 | Bibayan | ...................... | 715/825 |
| 5,581,753 A | 12/1996 | Terry et al. | | |
| 5,949,774 A * | 9/1999 | Seekins et al. | .............. | 370/331 |
| 6,021,132 A * | 2/2000 | Muller et al. | ................ | 370/412 |
| 6,094,424 A * | 7/2000 | Kalmanek et al. | ........... | 370/328 |
| 6,160,804 A * | 12/2000 | Ahmed et al. | ................ | 370/349 |
| 6,163,704 A * | 12/2000 | Joong et al. | .................. | 455/466 |
| 6,317,594 B1 * | 11/2001 | Gossman et al. | ......... | 455/414.1 |
| 6,377,982 B1 * | 4/2002 | Rai et al. | ..................... | 709/217 |
| 6,377,996 B1 * | 4/2002 | Lumelsky et al. | ........... | 709/231 |
| 6,421,539 B1 * | 7/2002 | Jeong | .......................... | 455/442 |
| 6,442,479 B1 * | 8/2002 | Barton | ........................ | 701/213 |

(Continued)

FOREIGN PATENT DOCUMENTS

EP   1039721   9/2000

(Continued)

OTHER PUBLICATIONS

U.S. Appl. No. 60/362,093, filed Mar. 7, 2002, Krishnamuthl et al.

(Continued)

*Primary Examiner*—Michael Won
(74) *Attorney, Agent, or Firm*—Banner & Witcoff, Ltd.

(57) ABSTRACT

The present invention provides a relocation of content sources that provide media content to a mobile terminal (mobile node) when a network layer-level handoff occurs. The relocation of content sources enables the mobile terminal to seamlessly execute an application that utilizes the media content from a current content source before the handoff and from a new content source after the handoff. The mobile terminal registers with a current access router in order to inform the access router about application context information. The current access router informs a new access router about the impending handoff. The new access router consequently discovers the new content source.

10 Claims, 5 Drawing Sheets

U.S. PATENT DOCUMENTS

| | | | |
|---|---|---|---|
| 6,445,776 B1* | 9/2002 | Shank et al. | 379/88.1 |
| 6,463,265 B1* | 10/2002 | Cohen et al. | 455/186.1 |
| 6,466,964 B1* | 10/2002 | Leung et al. | 709/202 |
| 6,473,411 B1 | 10/2002 | Kumaki et al. | |
| 6,484,211 B2* | 11/2002 | Turunen | 709/245 |
| 6,515,974 B1 | 2/2003 | Inoue et al. | |
| 6,594,498 B1* | 7/2003 | McKenna et al. | 455/517 |
| 6,601,101 B1* | 7/2003 | Lee et al. | 709/227 |
| 6,631,363 B1* | 10/2003 | Brown et al. | 707/1 |
| 6,654,359 B1* | 11/2003 | La Porta et al. | 370/328 |
| 6,704,571 B1* | 3/2004 | Moon | 455/436 |
| 6,711,147 B1* | 3/2004 | Barnes et al. | 370/338 |
| 6,714,778 B2* | 3/2004 | Nykanen et al. | 455/414.1 |
| 6,826,154 B2* | 11/2004 | Subbiah et al. | 370/236 |
| 6,910,078 B1* | 6/2005 | Raman et al. | 709/231 |
| 6,944,150 B1* | 9/2005 | McConnell et al. | 370/352 |
| 6,954,790 B2* | 10/2005 | Forslow | 709/227 |
| 6,970,423 B2* | 11/2005 | Chuah | 370/230 |
| 6,970,445 B2* | 11/2005 | O'Neill et al. | 370/338 |
| 6,973,309 B1* | 12/2005 | Rygula et al. | 455/436 |
| 6,996,618 B2* | 2/2006 | Apostolopoulos et al. | 709/227 |
| 7,010,300 B1* | 3/2006 | Jones et al. | 455/439 |
| 7,042,988 B2* | 5/2006 | Juitt et al. | 379/88.17 |
| 7,272,122 B2* | 9/2007 | Trossen et al. | 370/331 |
| 2002/0016831 A1 | 2/2002 | Ariel et al. | |
| 2002/0085517 A1* | 7/2002 | Lee et al. | 370/331 |
| 2002/0136226 A1* | 9/2002 | Christoffel et al. | 370/401 |
| 2003/0018715 A1* | 1/2003 | O'Neill | 709/204 |
| 2003/0085870 A1* | 5/2003 | Hinckley | 345/156 |
| 2003/0114158 A1* | 6/2003 | Soderbacka et al. | 455/436 |

FOREIGN PATENT DOCUMENTS

| | | |
|---|---|---|
| EP | 1189405 A1 | 3/2002 |
| WO | WO 0114990 | 3/2001 |

OTHER PUBLICATIONS

U.S. Appl. No. 10/144,281, filed May 10, 2002, Trossen et al.
U.S. Appl. No. 10/137,340, filed May 3, 2002, Trossen et al.
Calhoun et al, Low Latency Handoffs in Mobile IPv4, Internet Draft, <draft-ietf-mobileIp-lowlatency-handoffs-v4-04.txt>, Jun. 2002.
Koodli et al, Context Relocation for Seamless Header Compression in IP Networks, Internet Draft, <draft-koodli-seamoby-hc-relocate-01.txt>, Jul. 2001.
Westphal et al, Context Relocation of QoS Parameters in IP Networks, Internet Draft, <draft-westphal-seamoby-qos-relocate-00.txt>, Jul. 2001.
Johnson et al, Mobility Support in IPv6, Internet Draft, <draft-ietf-mobileip-ipv6-15.txt>, Jul. 2001.
Levkowetz et al, Reasons for Performing Context Transfers Between Nodes in an IP Access Network, Internet Draft, <draft-ietf-seamoby-context-transfer-problem-stat-04.txt>, May 2002.
Syed et al, General Requirements for a Context Transfer Framework, Internet Draft, <draft-ietf-seamoby-ct-reqs-00.txt>, May 2001.
Syed et al, QoS (DIFFSERV) Context Transfer, Internet Draft, <draft-hamid-seamoby-ct-qos-context-00.txt>, Jun. 2001.
Koodli et al, A Context Transfer Framework for Seamless Mobility, Internet Draft, <draft-koodli-seamoby-ctv6-01.txt>, Jul. 2001.
Yegin et al, Fast handovers for Mobile IPv6, Internet Draft, <draft-ietf-mobileip-fast-mipv6-04.txt>, Mar. 2002.
Hamer et al, Issues in IPSec context Transfer, Internet Draft, <gopal-seamoby-inspectxt-issues-01.txt, Feb. 2002.
Krishnamurthi et al, Requirements for Car Discovery Protocols, Internet Draft, <draft-krishnamurthi-seamoby-car-requirements-01.txt>, Jan. 2002.
IP Mobility Support, C. Perkins, Ed., Network Working Group, RFC 2002, Oct. 1996.
Trossen et al., Issues in Candidate Access Router Discovery for Seamless IP-Level Handoffs, Internet Draft draft-ietf-seamoby-cardiscovery-issues-02.txt, Jan. 2002.
International Search Report for PCT/IB03/01818 dated Sep. 22, 2003.
Hadjiefthymiades S. et al., "A Resource Management Scheme For Efficient WWW Computing in Wireless Communications". Vehicular Technology Conference. 1999. IEEE, vol. 3, Sep. 19, 1999, pp. 1755-1759, XP010353269.
Koodli R et al., "Fast Handovers and Context Transfers in Mobile Networks", Computer Communication Review, Association For Computing Machinery, vol. 31, No. 5, Oct. 2001, pp. 37-47, XP001115324.
Supplementary European Search Report for EP No. 03722910.1, Date: May 6, 2005.
Search Report from European Patent Office dated Jan. 22, 2008 from EP 1189405A1.

* cited by examiner

RELOCATION OF CONTENT SOURCES DURING IP-LEVEL HANDOFFS

This application claims priority to provisional U.S. Patent Application No. 60/375,414 ("Proactive Seamless Service Provisioning in Mobile Networks Through Registering and Transferring of Application Context in a Proactive-Committing Manner"), filed Apr. 26, 2002.

FIELD OF THE INVENTION

The present invention relates to the relocation of content sources for a mobile terminal during a network layer-level handoff.

BACKGROUND OF THE INVENTION

Providing seamless services is a critical issue for the success of wireless networks. In the context of services supported by the Internet protocol (IP), seamless IP-layer connectivity is necessary as a mobile terminal undergoes a handoff to a new access router with minimal disruption to the mobile terminal's Internet connectivity. There are several approaches to providing such seamless IP connectivity. First, the mobile IP protocol describes a mechanism that allows packets to be routed through the Internet to a new access router when the mobile terminal changes its point of attachment to the Internet from a current access router to a new access router. Also, after having established link-layer connectivity with the new access router, the mobile terminal typically engages in signaling the new access router in order to obtain its new care-of-address. When obtaining the new care-of-address, the mobile terminal has acquired IP-level connectivity with the new access router so that the mobile terminal can transmit and receive packets with the new access router. A fast handoff protocol enables forming the new care-of-address while the mobile terminal is still attached to the current access router. As soon as the mobile terminal acquires link-layer connectivity with the new access router, the mobile terminal can transmit and receive packets with the new access router.

Moving the mobile terminal's point of attachment to the Internet from the current access router to the new access router may not suffice to provide seamless service if the mobile terminal's application requires additional features for packet transport such as transport quality of service (QoS), security, and header compression. These features need to be provided at the new point of mobile terminal's attachment to the Internet after IP-layer handoff. This can be achieved via context transfer framework. Current approaches to a context transfer framework limit solutions to seamless IP-layer connectivity and do not address the service and business related aspects. In other words, ability to exchange packets with the Internet in an uninterrupted fashion in the light of handoffs as considered by current approaches, does not necessarily mean that the multimedia application on the mobile terminal will continue seamlessly. This is because, applications may make use of certain application-specific network functionalities, which may need to be relocated or provisioned concurrently with IP-layer handoffs.

Having the same content source support the mobile terminal after the IP-level handoff as before the IP-level handoff may present a number of issues. For example, the administrator of the network domain before the handoff may not be allowed to provide media content in the network domain after the handoff for several reasons. First, copyright restrictions based on the geographical location of the mobile terminal may restrict a region that a content source can serve. Also, a service provider may not allow the copyrighted and paid for content to cross its administrative network boundaries so as to prevent illegal copying and distribution of the content by third parties. Second, business agreements, such as revenue sharing between different wireless service providers and different content providers, may place limits on the span of a content source. Third, because of a number of mobile terminals that a content source can serve and a non-uniform traffic pattern that is served by a wireless system, the content source may be limited in the geographical region that the content source can serve. Moreover, it may not be economical to transport the media content from the content source to the new access network that is connected to the new access router, as they can be at large logical distances (such as in terms of IP hops) from each other.

Mobile applications, such as multimedia mobile Internet applications, typically require more than IP-connectivity to the Internet in order to provide seamless service for a mobile terminal. Even though a mobile terminal is able to exchange packets with the network, the mobile terminal may not be able to immediately execute an Internet application upon the completion of the handoff. Consequently, service disruption may occur despite having seamless IP connectivity if the application-specific functionality is not relocated at the time of mobile terminal's IP-level handoff.

Appropriate mechanisms may be required to relocate the content source from the current content source in the network domain before an IP-level handoff to the new content source in the network domain after the handoff so that the corresponding application executes seamlessly for the mobile terminal.

SUMMARY OF THE INVENTION

The present invention provides for a relocation of content sources that provide media content to a mobile terminal (mobile node) when a network layer-level handoff occurs. The relocation of content sources enables the mobile terminal to seamlessly execute an application that utilizes the media content from a current content source before the handoff and from a new content source after the handoff. The mobile terminal registers with a current access router in order to inform the access router about application context information. The current access router informs a new access router about the impending handoff. The new access router consequently discovers the new content source.

In an embodiment of the invention, the network comprises a current access router, a current content source, a new access router, and a new content source. The new access router and the new content source may be associated with a different administrative network domain than the current access router and the current content source. The embodiment supports an Internet protocol (IP) as the network layer, although other embodiments can support other network layer protocols (corresponding to the third layer of the Open Systems Interconnection model). Before an IP-level handoff, the current access router and the current content source provides media content to the mobile terminal. The mobile terminal registers with the current access router in order to provide application context information that is associated with the application. The current access router informs a new access router in response to an impending handoff. The new access router consequently discovers the new content source, which is able to provide the media content for the application. The new content source consequently establishes an IP path to the new care-of address of mobile terminal, via new access router. When the IP-level handoff does occur, the current content source informs the new content source about the current state of the application in order that the new content source can resume the application in a seamless manner.

In a variation of the embodiment, the mobile terminal initiates the IP-level handoff. In the embodiment, the mobile terminal may measure the signal strength of a received signal from a base transceiver station that is transmitting the media content to the mobile terminal. The mobile terminal compares the measured signal strength with a threshold. In another variation of the embodiment, the current access router initiates the IP-level handoff as determined by measuring a signal strength of a received signal.

DETAILED DESCRIPTION OF THE INVENTION

In the following description of the various embodiments, reference is made to the accompanying drawings that form a part hereof, and in which is shown by way of illustration various embodiments in which the invention may be practiced. It is to be understood that other embodiments may be utilized and structural and functional modifications may be made without departing from the scope of the present invention.

Figure 1:
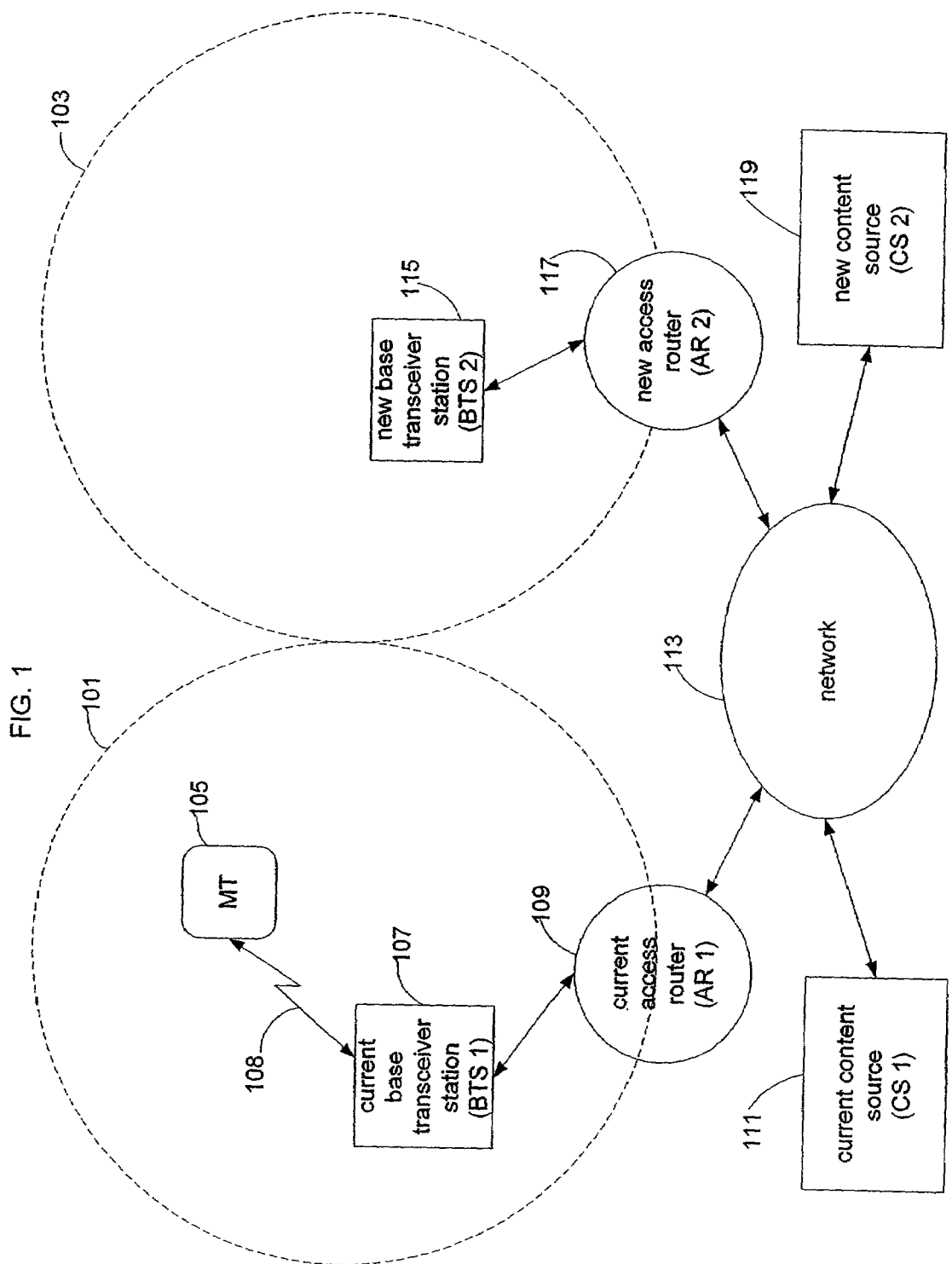
FIG. 1 shows an architecture that supports a relocation of content sources during an IP-level handoff in accordance with an embodiment of the invention.

FIG. 1 shows an architecture that supports a relocation of a current content source 111 to a new content source 119 during a IP-level handoff in accordance with an embodiment of the invention. In the embodiment, seamless IP packet bearer may be provided by a procedure as supported by Mobile IP (Mobile IP Specification: Internet Engineering Task Force RFC 3220 and draft-ietf-mobileip-ipv6-16.txt), fast handoff, and context transfer. In other embodiments of the invention, other network-level protocols can be utilized. Before the occurrence of the IP-level handoff, while a mobile terminal (MT) 105 is situated in a serving area within an administrative region 101, current content source (CS) 111 generates a packet data stream through a network 113, a current access router 109, a base transceiver station (BTS) 107, a wireless channel 108 (e.g. a wireless LAN in accordance IEEE 802.11) to mobile terminal (MT) 105. (Mobile terminal 105 can be alternatively referred as a mobile node.) Current access router 109 provides access to network 113 for administrative region 101. In other embodiments, a plurality of access routers may support an administrative region (e.g. administrative region 101). Even though FIG. 1 depicts only one base transceiver station within administrative region 101, a plurality of base transceiver stations typically support an administrative region such as 101. The packet data stream can support a variety of services to mobile terminal 105 such as a streaming video service, in which the packet data stream corresponds to a video stream. Because mobile terminal 105 is characterized by mobility, mobile terminal 105 can move into an administrative region 103. An administrative region is typically associated with a service provider, a radio access technology, and a geographical area. However, the operator of current content source may not be able to continue sending media content to mobile terminal 105 when mobile terminal 105 enters administrative region 103 (corresponding to the IP-level handoff) for a number of reasons, including exclusive copyright restrictions that are associated with administrative region 103. Also, current content source 11 may be logically distant (as measured by IP hops) from a new access router 117, thus being uneconomical to configure. In such cases, the delivery of content is assumed by a new content source 119 sending a packet data stream to mobile terminal 105 through network 113, a new access router 117, and base transceiver station 115.

Figure 2:
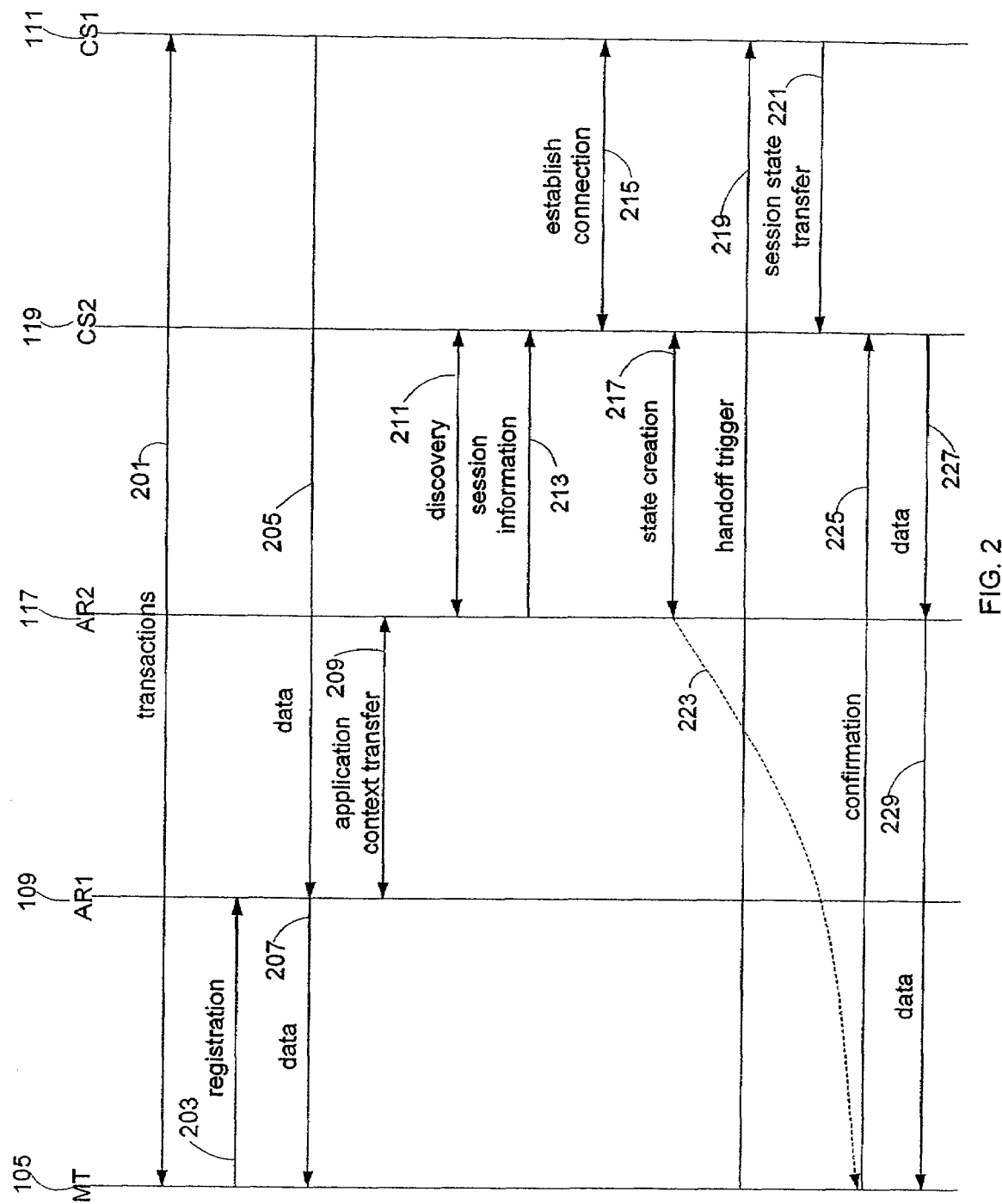
FIG. 2 shows a message scenario that supports a relocation of content sources during an IP-level handoff in a accordance with an embodiment of the invention.

FIG. 2 shows a message scenario that supports a relocation of current content source 111 to new content source 119 during an IP-level handoff in a accordance with an embodiment of the invention. With transactions procedure 201, mobile terminal 105 and current content source 111 sets up a data session in order to initiate the packet data stream from current content source 111 to mobile terminal 105. Typically, current access router 109 is unaware of all the specific characteristics of end-user applications being executed by mobile terminal 105. In the embodiment, session initiation protocol (SIP in accordance with Internet Engineering Task Force RFC 2543) is utilized. Message content that is exchanged between mobile terminal 105 and current content source 111 is typically not visible to current access router 109 during SIP transaction 201. Consequently, registration procedure 203 may be executed by mobile terminal 105 in order to explicitly register application context information with current access router 109. In the embodiment, registration procedure 203 utilizes Internet control message protocol (ICMP that is specified in Internet Engineering Task Force RFC 792), user datagram protocol (UDP), transmission control protocol (TCP), or any standard method of message transfer between nodes in an IP network. Other embodiments may utilize other protocols such as hypertext transfer protocol (Internet Engineering Task Force RFC 2616). The registration procedure may occur at a time of initiation of an Internet application, or just prior to a handoff, or at any time between the initiation and the handoff The format of the application context information is dependent upon the specific application. In the embodiment, the application context information comprises a content profile and a media description. With a video streaming application, for example, the content profile may comprise a video clip number that identifies the video medium being viewed by a user of mobile terminal 105. The media description may comprise a video coding scheme for encoding the video stream, bandwidth requirements and quality of service (QoS) requirements for transmitting the video stream, and a viewing pointer that marks where the user of mobile terminal 105 is currently viewing the video medium. As will be subsequently discussed, the viewing pointer may be used by new content source 119 in order to provide viewing continuity when the call is handed off to a base transceiver station 115 in administrative region 103.

A packet data stream 205 is generated by current content source 111 in order to support the application as established in transaction procedure 201 and forwarded by current access router 109 to mobile terminal 105 as packet data stream 207. Packets of packet data streams 205 and 207 are typically delivered to mobile terminal 105 utilizing a care-of address (Internet Engineering Task Force RFC 2002) if mobile terminal 105 is not located in a region that is served by its home agent (router). The care-of address is the termination point of a tunnel toward mobile terminal 105 (mobile node) for packets forwarded to mobile terminal 105 when mobile terminal 105 is not located in its home serving area.

If mobile terminal 105 approaches the boundary between administrative boundary 101 and administrative boundary 103, current access router 109 may determine that an IP-level handoff may occur. In the embodiment, base transceiver station 107 measures the signal strength of mobile terminal 105 (corresponding to the forward direction or the downlink). If the signal strength is below a signal threshold, base transceiver station 107 notifies current access router 109 about the impending handoff. In a variation of the embodiment, mobile terminal 105 measures a signal strength of the signal received over wireless channel 108 from base transceiver station 107 (corresponding to the forward direction or the downlink). If the signal strength is below a signal threshold, mobile terminal 105 notifies current access router 109 through base transceiver station 107.

When current access router 109 determines that an IP-level handoff may occur, current access router 109 provides new access router 117 with the application context information by sending an application context transfer message 209 to new access router 117. The embodiment can utilize ICMP, UDP, TCP, stream control transmission protocol (SCTP) (Internet Engineering Task Force RFC 2960), or any method for transferring messages between two nodes in an IP network. Consequently, new access router 117 performs a discovery procedure 211 in order to find new content source 119 to support the media content being utilized by mobile terminal 105. In the embodiment, new access router 117 can discover new content source 119 by using a static configuration (e.g. accessing a data structure that is maintained at new access router 117 in which an address of new content source 119 is mapped to the content profile), accessing a directory agent that may be external to new access router 117, or sending a multicast query that contains the content profile. With the multicast query, new content source 119 responds to the query if new content source 119 can support mobile terminal 105 with the associated media selection in administrative region 103.

By sending a session information message 213 to new content source 119, new access router 117 provides new content source 119 with the content profile, a new care-of address that has been assigned to mobile terminal 105, and an address of current content source 111. Additionally, new access router 117 can provide some of the information that is associated with the media description (e.g. bandwidth and QoS characteristics at the new access router 117). This additional information can help (if required) to adapt the content that is transmitted by the packet data stream originating from the new content source 119 to connectivity parameters that are associated with new IP path (new content source 119 to network 113 to new access router 117 to base transceiver station 115).

Subsequently, new content source 119 contacts current content source 111 by an establish connection procedure 215. In a variation of the embodiment, current content source 111 provides media description information to new content source 119. The established connection between current content source 111 and new content source 119 remains available for subsequent communications as will be discussed.

With a state creation procedure 217, new content source 119 configures the new IP path between new content source 119 and new access router 117 (corresponding to the new care-of address) according to states (e.g. QoS level) that are consistent with the media description. QoS establishment along the new path can be done using protocols such as Resource Reservation Protocol (RSVP), or other QoS signaling protocols that are being designed in the Next Steps in Signaling (NSIS) working group of IETF. Configuring the new IP path may also involve creating a pinhole in the firewall that may reside between the new access router 117 and the new content source 119. The new IP path may not be able to support the media description that is supported by the current IP path (current content source 111 to network 113 to current access router 109 to base transceiver station 107). In such a case, new content source 119 may redefine the media description (e.g. modifying the coding format, altering resolution, resizing, and adjusting the degree of motion) and send the modified media description to the new care-of address of mobile terminal via the new access router 117 as part of state creation procedure 217. The communication of new media description may be done using SIP messages. In the embodiment, new access router 117 stores the modified media description (or the corresponding SIP message). New access router 117 subsequently sends the modified media description (or the corresponding SIP message) to mobile terminal 105 in an action 223 when mobile terminal 105 performs the IP-level handoff. In another embodiment, the new access router can send the modified media description (or the corresponding SIP message) to mobile terminal 105 via the current access router 109. Mobile terminal 105 acknowledges the reception of the modified description with a confirmation message 225.

When mobile terminal 105 crosses the boundary into administrative region 103, mobile terminal 105 sends a handoff trigger message 219 to current content source 111. In other embodiments, current access router 109 or new access router 117 may send handoff trigger message 219 to current content source 111. Handoff trigger message 219 can be sent using ICMP, UDP, TCP, mobile IP binding update (Internet Engineering Task Force RFC 3220 and draft-ietf-mobileip-ipv6-16.txt), or any method of message transfer between two nodes in an IP network.

Upon reception of handoff trigger message 219, current content source 111 "pushes" information with a session state transfer message 221 about the progress of the session (e.g. the video pointer) to new content source 119. The connection that is established with established connection procedure 215 is utilized to send session state transfer message 221. In another embodiment, if the session progress state information is included in the application context, the current access router 109 or the new access router 117 can inform it to the new content source 119 in another handoff trigger. In another embodiment, the mobile terminal 105 can inform the new content source about the session progress state information along with the confirmation message 225. In another embodiment, the mobile terminal 105 or the current access router 109 or the new access router 117 can inform the current content source 111 about the session state information which in turn pushes it to the new content source 119. New content source 119 now supports the data session by generating packet data stream 227 to the new care-of address of mobile terminal 105 via new access router 117. New access router 117 forwards packet data stream 229 to mobile terminal 105.

Figure 3:
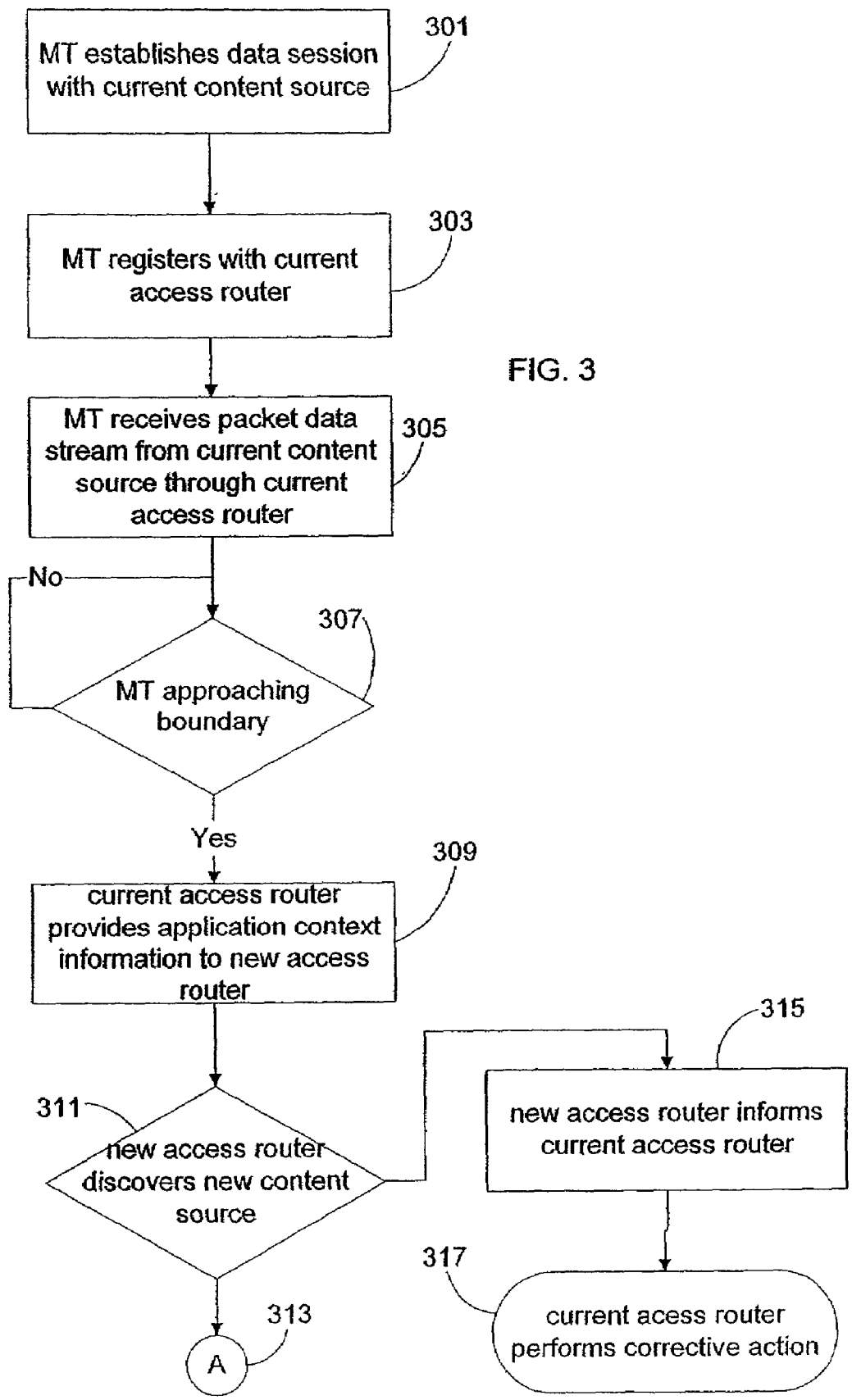
FIG. 3 shows a flow diagram of an embodiment of the invention corresponding to FIG. 2.

FIG. 3 shows a flow diagram of an embodiment of the invention corresponding to FIG. 2. In step 301, mobile terminal 105 establishes a data session in order to support the desired application by executing transactions procedure 201. In step 303 (corresponding to registration procedure 203), mobile terminal 105 registers application context information (that is associated with the application) with current access router 109. In step 305, a packet data stream is generated by current content source 111 to mobile terminal 105 through current access router 109 in accordance with the application that is requested by the user of mobile terminal 105.

If mobile terminal 105 approaches the boundary of administrative region 101 as determined in step 307, current access router 109 provides the application context information to new access router 117 in step 309 (corresponding to application context transfer message 209). In the embodiment, current access router 109, in conjunction with base transceiver station 107, determines whether a signal strength of a received signal on the reverse link of wireless channel 108 is below a first threshold. With a variation of the embodiment, current access router 109 determines whether mobile terminal 105 is approaching the boundary by receiving a message from mobile terminal 105 that indicates that a signal strength of a received signal on the forward link of wireless channel 108 is below a second threshold. Upon receiving the application context information, new access router 117 executes discovery procedure 211 in step 311. In step 311 (corresponding to discovery procedure 211), new access router 117 attempts to find a new content source (i.e. 119) that can generate a packet data stream that will continue to support the application for mobile terminal 105. If step 311 is not successful in discovering a new content source, new access router 119 notifies current access router 111 in step 315. Consequently, current access router 111 performs corrective action. The embodiment can support one of a plurality of corrective responses such notifying mobile terminal 105 about the possible termination of the data session if mobile terminal 105 continues into administrative region 103. The user of mobile terminal 105, for example, may decide to alter his/her itinerary so that the application can continue to the end of the media presentation.

Figure 4:
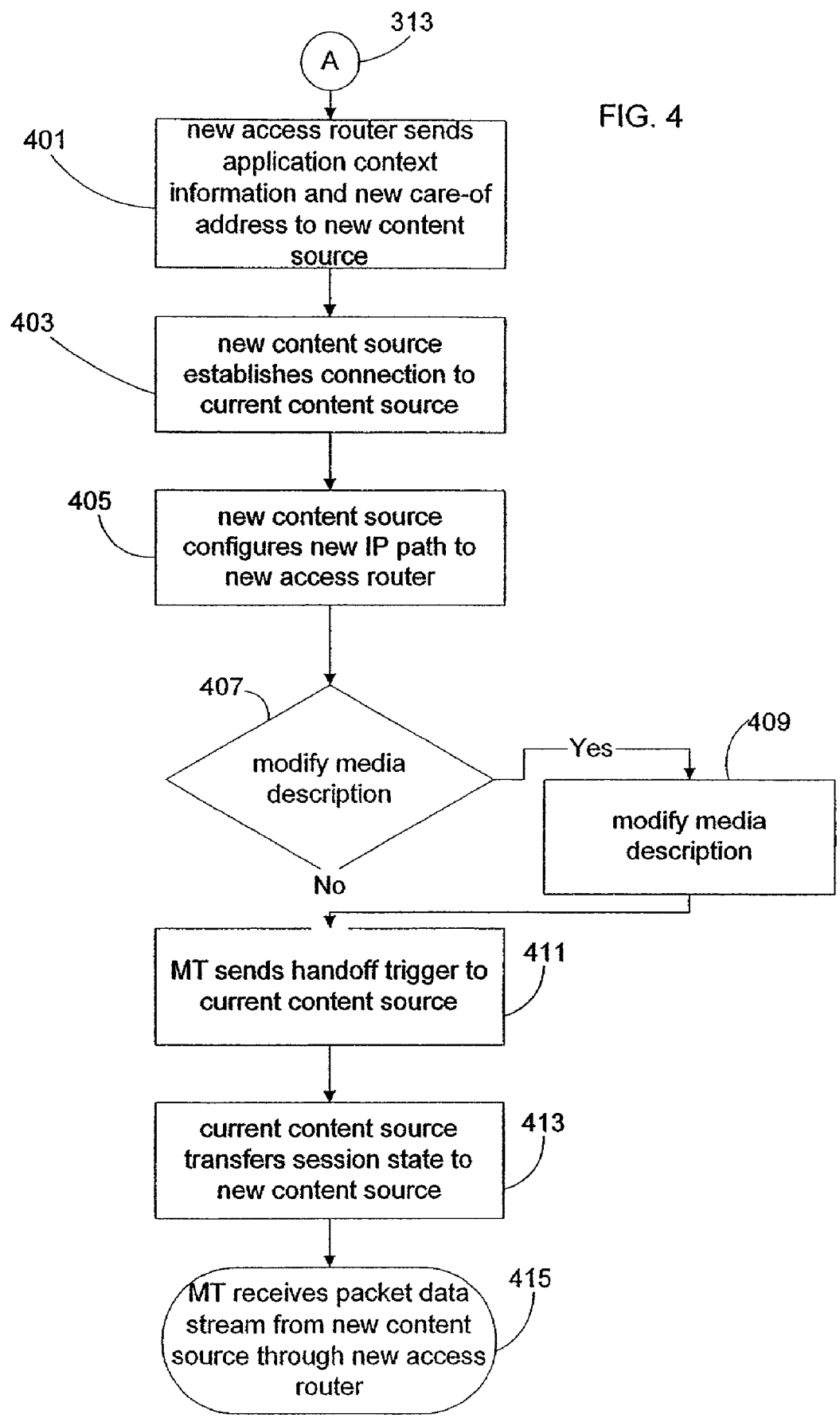
FIG. 4 is a continuation of the flow diagram shown in FIG. 3.

FIG. 4 is a continuation of the flow diagram shown in FIG. 3. Step 401 is in response to step 311 in FIG. 3. In step 401, new access router sends the application context information and a new care-of address to new content source 119 (corresponding to session information message 213). The new care-of address is used in step 415 for new access router 117 to forward packets from new content source 119 to mobile terminal 105 after the IP-level handoff.

In step 403, new content source establishes a connection with current content source 111. In a variation of the embodiment, the media description is provided to new content source 119 from current content source 111. In the embodiment, the application context information (as sent in step 401 from new access router 117 to new content source 119) comprises the media description. In step 405, new content source 119 configures a new IP path to new access router 117 (corresponding to state creation 217). If new content source 119 determines that the media description needs to be modified in accordance with characteristics of the new IP path (e.g. the supported bandwidth may be less than the supported bandwidth of the old IP path) in step 407, new content source 119 modifies the media description and informs so to the new care-of address of mobile terminal 105 in step 409.

In step 411 (corresponding to handoff trigger 219), mobile terminal (or current access router 109 or new access router 117) 105 sends a handoff trigger to current content source 111 when mobile terminal 105 crosses the administrative region boundary into administrative region 103. Consequently, current content source 111 transfers the session state to new content source 119 in step 413 (corresponding to session state transfer message 221). Current content source 111 informs new content source 119 about the point of the media content that is being played before the IP-level handoff in step 413.

New content source 119 resumes playing the media content at the same point in order to provide presentation continuity to the user of mobile terminal 105. In step 415, mobile terminal 105 receives a packet data stream from new content source 119 through new access router 117 while mobile terminal 105 is located in administrative region 103.

Figure 5:
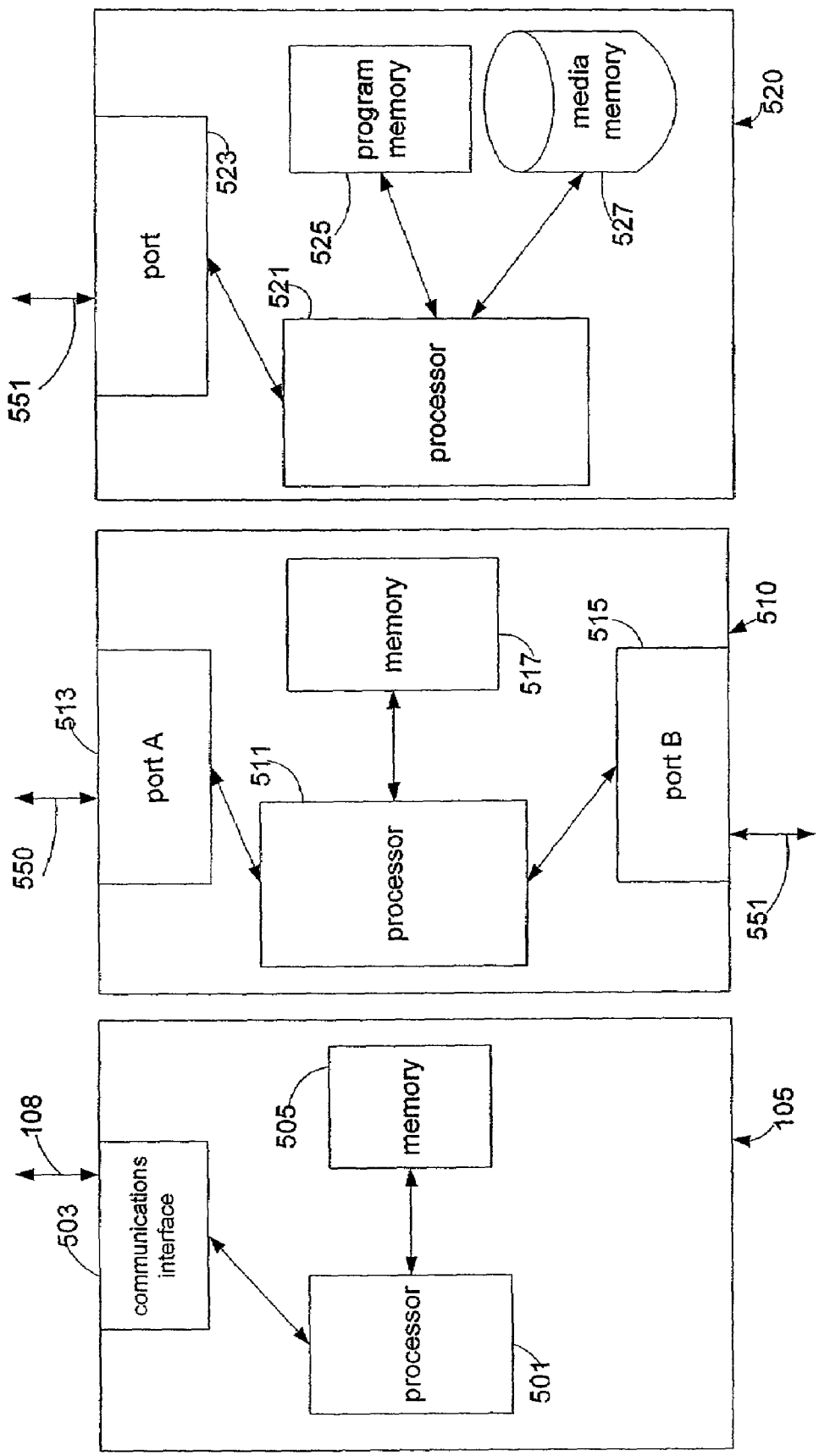
FIG. 5 shows apparatus for a mobile terminal, an access router, and a content source in accordance with an embodiment of the invention.

FIG. 5 shows apparatus for mobile terminal 105, an access router 510 (e.g. current access router 109 and new access router 117), a content source 520 (e.g. current content source 111 and new content source 119) in accordance with an embodiment of the invention. Mobile terminal 105 comprises a processor 501, a communications interface 503, and memory 505. Mobile terminal 105 communicates over wireless channel 108 through communications interface 503. Processor 501 executes a software program from memory 505 in accordance with the message scenario shown in FIG. 2 and the flow diagrams shown in FIGS. 3 and 4.

Access router 510 comprises a processor 511, ports 513 and 515, and a memory 517. Processor 511 communicates with a base transceiver station through port 513 through an IP path 550 and with a content source through port 515 and an IP path 551. Processor 511 executes a software program from memory 517 in accordance with the message scenario shown in FIG. 2 and the flow diagrams shown in FIGS. 3 and 4.

Content source 520 comprises a processor 521, a port 523, a program memory 525 and a media memory 527. Processor 521 communicates with access router 510 through port 523 and IP path 551. Processor 521 executes a software program from program memory 525 in accordance with the message scenario shown in FIG. 2 and the flow diagrams shown in FIGS. 3 and 4. Also, processor 521 generates a packet data stream by accessing media memory 527 in order to obtain the media content that is being played for the data session.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An apparatus comprising:
   a mobile terminal communications interface; and
   a processor configured to communicate through the communications interface, the processor configured to perform:
   initiating an application supported by the apparatus
   receiving, from a current content source, a packet data stream that is associated with the application;
   forwarding application context information that is associated with the application to an access router for registration thereon, the application context information including a content profile and a media description, the application context information configured to be used in establishing a connection with a new content source; and
   receiving the packet data stream from the new content source in response to the apparatus completing a network layer-level handoff.

2. The apparatus of claim 1, wherein the processor is further configured to perform:
   sending a first trigger that indicates to transfer the application context information; and
   sending a handoff trigger that causes the apparatus to be served by the new content source.

3. The apparatus of claim 1, wherein the media description comprises a pointer to a media content that is sent by the current content source and the new content source.

4. The apparatus of claim 1, wherein the processor is further configured to perform:
   receiving a modified media description; and
   processing the packet data stream in accordance with the modified media description.

5. The apparatus of claim 4, wherein the processor is further configured to perform:
   sending an acknowledgement in response to receiving the modified media description.

6. A method comprising:
   initiating an application with a mobile terminal;
   receiving from a current content source, a packet data stream that supports the application;
   forwarding application context information that is associated with the application to an access router for registration thereon, the application context information including a content profile and a media description, the application context information configured to be used in establishing a connection with a new content source; and
   receiving the packet data stream from the new content source in response to the mobile terminal completing a network layer-level handoff.

7. The method of claim 6, further comprising:
   sending a first trigger that indicates to transfer the application context information; and
   sending a handoff trigger that causes the mobile terminal to be served by the new content source.

8. The method of claim 6, further comprising:
   receiving a modified media description; and
   processing the packet data stream in accordance with the modified media description.

9. The method of claim 8, further comprising:
   sending an acknowledgement in response to receiving the modified media description.

10. An apparatus comprising:
    a mobile terminal communications interface; and
    a processor configured to communicate through the communications interface, the processor configured to perform:
    initiating an application supported by the apparatus;
    receiving, from a current content source, a packet data stream that is associated with the application;
    forwarding application context information that is associated with the application to an access router for registration thereon, the application context information including a content profile and a media description, the application context information configured to be used in establishing a connection with a new content source;
    sending a first trigger that indicates to transfer the application context information;
    sending a handoff trigger that causes the apparatus to be served by the new content source; and
    receiving the packet data stream from the new content source in response to the apparatus completing a network layer-level handoff.

* * * * *